Aug. 23, 1949.    R. B. TACKABERRY    2,479,792
OPTICAL SYSTEM FOR VARIABLE POWER TELESCOPES
Filed May 15, 1948

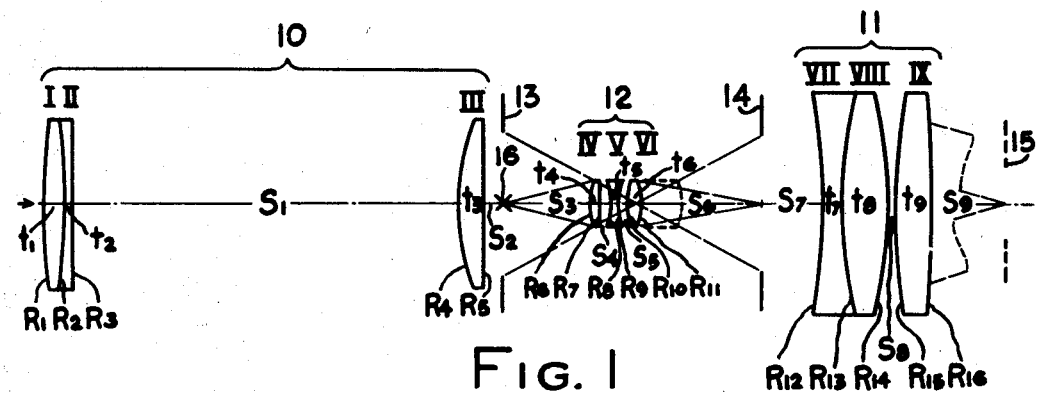

FIG. 1

| ELEMENT | $N_D$ | V | RADII | THICKNESSES |
|---|---|---|---|---|
| OBJECTIVE E.F. = 118.5 mm. | | | | |
| I | 1.517 | 64.5 | $R_1 = +80.7$ | $t_1 = 2.6$ |
|  |  |  | $R_2 = -67.2$ | $t_2 = 1.9$ |
| II | 1.617 | 36.6 | $R_3 = -671.8$ | $S_1 = 154.0$ |
| III | 1.517 | 64.5 | $R_4 = +16.7$ | $t_3 = 5.0$ |
|  |  |  | $R_5 = \infty$ | $S_2=6.6$ $S_3=19.8$ to $25.8$ |
| ERECTOR E.F. = 12.6 mm. | | | | |
| IV | 1.617 | 55.0 | $R_6 = +5.15$ | $t_4 = 1.1$ |
|  |  |  | $R_7 = \infty$ | $S_4 = 1.4$ |
| V | 1.649 | 33.8 | $R_8 = -7.0$ | $t_5 = 0.4$ |
|  |  |  | $R_9 = +5.0$ | $S_5 = 1.0$ |
| VI | 1.617 | 55.0 | $R_{10} = +13.5$ | $t_6 = 1.2$ |
|  |  |  | $R_{11} = -5.5$ | $S_6=26.0$ to $19.9$ $S_7=25.1$ |
| EYEPIECE E.F. = 37.5 mm. | | | | |
| VII | 1.751 | 27.7 | $R_{12} = -73.3$ | $t_7 = 3.5$ |
|  |  |  | $R_{13} = +31.5$ | $t_8 = 10.0$ |
| VIII | 1.611 | 57.2 | $R_{14} = -31.5$ | $S_8 = 1.0$ |
| IX | 1.611 | 57.2 | $R_{15} = +44.0$ | $t_9 = 6.5$ |
|  |  |  | $R_{16} = -137.0$ | $S_9 = 100.0$ |

FIG. 2

Inventor
ROBERT B. TACKABERRY

Patented Aug. 23, 1949

2,479,792

UNITED STATES PATENT OFFICE 2,479,792

OPTICAL SYSTEM FOR VARIABLE POWER TELESCOPES

Robert B. Tackaberry, Rochester, N. Y., assignor to Bausch & Lomb Optical Company, Rochester, N. Y., a corporation of New York Application May 15, 1948, Serial No. 27,217

3 Claims. (Cl. 88—32)

The present invention relates to variable power telescopes and more particularly relates to improvements in the optical systems thereof.

In designing variable power telescopes for the purpose of sighting firearms, it is desirable that the eye distance, i. e., the distance between the telescope eyepiece and the eye of the observer, be as near constant as possible for all magnifications of the instrument. When using such a telescope, the observer may adjust the instrument on the gun permanently at the most comfortable eye distance and upon changing the power of the telescope, no consequential longitudinal readjustment of the instrument or the posture of the observer is necessary. It is also important that the diameter and the length of the telescope be kept to a minimum so as to reduce the weight and cost of the instrument. These desirable features should be obtained without sacrificing good optical properties in the instrument such as chromatic, comatic, spherical, and astigmatic aberrations as well as flatness of the field.

Having outlined some of the desirable features of a variable power telescope, it is an object of this invention to provide such an instrument which embodies all of the above-mentioned desirable features. It is also an object to provide such a device by the use of a well corrected erector lens of relatively short focal length. These and other objects and advantages reside in the details of construction and the arrangement and combination of the parts as described hereinafter and as shown in the accompanying drawing in which, Fig. 1 is a schematic diagram of the optical system of a telescope embodying the invention, and Fig. 2 is a chart showing the constructional data of the optical system.

As shown in Fig. 1 of the drawing, the optical system of the telescope comprises an objective lens 10, an eyepiece lens 11 for viewing the image formed by the objective lens and an erector lens 12 for erecting said image. The erector lens 12 is movable along the optical axis of the instrument for varying the power or magnification of the telescope between a value of substantially 2.5 and 4.0, although these values are not exclusive for the purposes of this invention. The erector lens is shown in high power position in full lines and its low power position is indicated by dotted lines in the drawing. The objective lens 10 comprises the front member, having a positive element I and a negative element II forming an achromatic doublet, and the rear member which is a fixed collective element III. At the focal plane of the objective lens, a diaphragm 13 is located to limit the principal rays passing beyond the objective lens. The eyepiece lens 11 is composed of two members which are a doublet having the negative element VII and positive element VIII, and a single collective element IX. In the front focal plane of the eyepiece lens, a diaphragm 14 is positioned so as to limit the principal rays entering said lens. The erector lens 12 is well corrected for chromatic, comatic, spherical, and astigmatic aberrations and flatness of the field and consists of the two collective elements IV and VI and an intervening dispersive element V. The eyepiece lens 11 is also well corrected with regard to the above-mentioned aberrations so that the degree of correction in the erector lens 12 is maintained in the image at the exit pupil 15. In the focal plane of the objective lens 10, a reticle 16 is located closely adjacent the collective element III. An image of reticle 16 is formed by the erector lens 12 in the front focal plane of the eyepiece lens 11 at 14.

In this invention, it has been discovered that by making the focal length of the erector lens 12 relatively short, e. g., substantially 0.25-0.40 times the focal length of the eyepiece lens 11, the eye distance $S_9$ from the rear surface of element IX to the exit pupil 15 remains substantially constant for all magnifications of the image. The focal length of the erector lens 12 is also substantially equal to .40 of the focal length of the collective member III. The erector lens 12 has two conjugate positions, which are the low and high power positions mentioned heretofore, where said lens sharply projects the image formed by the objective lens at 13 into the front focal plane of the eyepiece lens at 14. Due to the short focal length of the erector lens 12, an axial displacement thereof amounting to substantially 0.1-0.2 of the focal length of the eyepiece lens 11 is sufficient to vary the power of the instrument substantially between 2.5 and 4.0. Due also to said short focal length, the image formed by the erector lens 12 remains substantially focused at 14 during movement of the lens from one conjugate position to another. The greatest deviation in position of the image formed by the erector lens 12 away from the front focal plane at 14 of the eyepiece lens 11 within the above-mentioned range of power is only 0.68 mm. thus necessitating less than a half diopter of accommodation at the eye which is easily accommodated. The eye distance $S_9$ actually varies by no more than 2.5 mm. from the nominal value of 100 mm. for all powers of the telescope between 2.5 and 4.0.

Although the aperture stop of most telescopes is the objective lens, the erector lens 12 here serves that purpose. By locating the erector lens 12 axially close to the place on the optical axis where the cone of image rays approaches minimum diameter between the conjugate image planes at 13 and 14, the diameter of the erector lens may be reduced to form the aperture stop of the optical system. Since the movement of the erector lens between its conjugate imaging positions is so very short, the aperture stop remains substantially at the erector lens for all magnifications of the instrument. These conditions yield a relatively large exit pupil with an optimumly small aperture stop at the erecting lens which contributes greatly to optimum optical performance of the instrument at both extreme and intermediate magnifications. In this way the outer diameter of the telescope is reduced to a minimum, thus providing additional radial space around the erector lens 12 for accommodating the mechanism by which it is moved.

In using a variable power telescope embodying this invention for the purpose of sighting a gun, the gunner assumes a steady and comfortable position with his eye at the exit pupil 15 of the telescope. Regardless of the power of the instrument used in sighting the object, the observer's head need not be moved from a fixed position since the exit pupil 15 does not move appreciably for any selected magnification within the range of power of the instrument.

Fig. 2 gives the constructional data for one specific form of the invention as duplicated below in the chart;

| Element | $N_D$ | V | Radii | Thicknesses |
|---|---|---|---|---|
| OBJECTIVE E. F. 118.5 MM. | | | | |
| I | 1.517 | 64.5 | $R_1=+80.7$ | $t_1=2.6$ |
| | | | $R_2=-67.2$ | $t_2=1.9$ |
| II | 1.617 | 36.6 | $R_3=-671.8$ | $S_1=154.0$ |
| | | | $R_4=+16.7$ | $t_3=5.0$ |
| III | 1.517 | 64.5 | $R_5=\infty$ | $S_2=6.6$ |
| | | | | $S_3=19.8$ to $25.8$ |
| ERECTOR E. F. 12.6 MM. | | | | |
| IV | 1.617 | 55.0 | $R_6=+5.15$ | $t_4=1.1$ |
| | | | $R_7=\infty$ | $S_4=1.4$ |
| V | 1.649 | 33.8 | $R_8=-7.0$ | $t_5=0.4$ |
| | | | $R_9=+5.0$ | $S_5=1.0$ |
| | | | $R_{10}=+13.5$ | $t_6=1.2$ |
| VI | 1.517 | 55.0 | $R_{11}=-5.5$ | $S_6=26.0$ to $19.9$ |
| | | | | $S_7=25.1$ |
| EYEPIECE E. F. 37.5 MM. | | | | |
| VII | 1.751 | 27.7 | $R_{12}=-73.3$ | $t_7=3.5$ |
| | | | $R_{13}=+31.5$ | $t_8=10.0$ |
| VIII | 1.611 | 57.2 | $R_{14}=-31.5$ | $S_8=1.0$ |
| | | | $R_{15}=+44.0$ | $t_9=6.5$ |
| IX | 1.611 | 57.2 | $R_{16}=-137.0$ | $S_9=100.0$ mm. |

It will be understood from the above description that because of the short focal length of the erector lens 12 and the restriction of its axial movement, the eye distance $S_9$ is substantially constant while the size of the instrument is reduced to a minimum in accordance with the objects of this invention. Although but one specific form of the invention has been shown and described in detail, other forms are possible, and other values may be substituted in the constructional data within the range of values specified in the appended claims and changes may be made in the form and arrangement of parts without departing from the spirit of the invention as defined in the appended claims.

I claim:

1. A variable power telescope comprising fixed objective and eyepiece lenses in optical alignment, a reticle positioned between said lenses in the focal plane of the objective lens, said objective lens including a collective member located adjacent the front side of the reticle, and an erector lens having a focal length which is substantially equal to 0.25–0.40 of the focal length of the eyepiece lens and also substantially equal to .40 of the focal length of the collective member, said erector lens being movable between its two conjugate imaging positions to vary the power of the telescope.

2. A variable power telescope comprising fixed objective and eyepiece lenses in optical alignment, a reticle located in the plane of the real image formed by the objective lens, said objective lens including a collective member, and an erector lens having a focal length substantially equal to 0.25–0.40 of the focal length of the eyepiece lens and substantially equal to .40 of the focal length of the collective member, said erector lens being movable between its two conjugate imaging positions which are spaced from each other by an amount substantially equal to 0.1–0.2 of the focal length of the eyepiece lens whereby the image formed by the erector lens in either of said positions remains substantially in the focal plane of the eyepiece lens and the eye distance remains substantially constant for any position of the erector lens.

3. A variable power telescope comprising an objective lens, an eyepiece lens and an erector lens corrected for chromatic, comatic, spherical, and astigmatic aberrations and flatness of field, said lenses having constructional data as defined in the table of values given below, the Roman numerals in the first column designating the component elements in order from front to rear, $N_D$ being the index of refraction of the glass for the D line of the spectrum, V being the dispersion index, $R_1$ to $R_{16}$ being the radii of the refracting surfaces in order from front to rear and the signs + and − indicating respectively convex and concave surfaces relative to incident light, $t_1-t_9$ being the axial thickness of the elements in order from front to rear, $S_1-S_9$ being axial spaces between the elements in order from front to rear, and E. F. designating the focal lengths of the objective, eyepiece and erector lenses:

| Element | $N_D$ | V | Radii | Thicknesses |
|---|---|---|---|---|
| OBJECTIVE E. F. 118.5 MM. | | | | |
| I | 1.517 | 64.5 | $R_1=+80.7$ | $t_1=2.6$ |
| | | | $R_2=-67.2$ | $t_2=1.9$ |
| II | 1.617 | 36.6 | $R_3=-671.8$ | $S_1=154.0$ |
| | | | $R_4=+16.7$ | $t_3=5.0$ |
| III | 1.517 | 64.5 | $R_5=\infty$ | $S_2=6.6$ |
| | | | | $S_3=19.8$ to $25.8$ |

| Element | $N_D$ | V | Radii | Thicknesses |
|---|---|---|---|---|
| ERECTOR E. F. 12.6 MM. | | | | |
| IV | 1.617 | 55.0 | $R_6 = +5.15$ | $t_4 = 1.1$ |
| | | | $R_7 = \infty$ | $S_4 = 1.4$ |
| V | 1.649 | 33.8 | $R_8 = -7.0$ | $t_5 = 0.4$ |
| | | | $R_9 = +5.0$ | $S_5 = 1.0$ |
| VI | 1.617 | 55.0 | $R_{10} = +13.5$ | $t_6 = 1.2$ |
| | | | $R_{11} = -5.5$ | $S_6 = 26.0$ to $19.9$ |
| | | | | $S_7 = 25.1$ |
| EYEPIECE E. F. 37.5 MM. | | | | |
| VII | 1.751 | 27.7 | $R_{12} = -73.3$ | $t_7 = 3.5$ |
| VIII | 1.611 | 57.2 | $R_{13} = +31.5$ | $t_8 = 10.0$ |
| | | | $R_{14} = -31.5$ | $S_8 = 1.0$ |
| IX | 1.611 | 57.2 | $R_{15} = +44.0$ | $t_9 = 6.5$ |
| | | | $R_{16} = -137.0$ | $S_9 = 100.0$ mm. |

ROBERT B. TACKABERRY.

REFERENCES CITED

The following references are of record in the file of this patent:

UNITED STATES PATENTS

| Number | Name | Date |
|---|---|---|
| 1,464,655 | Jacob | Aug. 14, 1923 |
| 2,171,360 | Strang | Aug. 29, 1939 |
| 2,430,549 | Altman | Nov. 11, 1947 |

FOREIGN PATENTS

| Number | Country | Date |
|---|---|---|
| 303,787 | Great Britain | Nov. 21, 1928 |
| 536,706 | Great Britain | May 23, 1941 |